United States Patent [19]
Kawamura et al.

[11] 4,103,191
[45] Jul. 25, 1978

[54] STEP MOTOR

[75] Inventors: Yoshikazu Kawamura, Shimosuwa; Hiroshi Eguchi, Suwa, both of Japan

[73] Assignee: Kabushiki Kaisha Suwa Seikosha, Tokyo, Japan

[21] Appl. No.: 476,011

[22] Filed: Jun. 3, 1974

[30] Foreign Application Priority Data

Jun. 1, 1973 [JP] Japan ................................. 48-61522
Jun. 5, 1973 [JP] Japan ................................. 48-63127

[51] Int. Cl.² .......................................... H02K 37/00
[52] U.S. Cl. .................................... 310/49 R; 310/154
[58] Field of Search ................. 310/49, 152, 154, 156, 310/162–164, 181

[56] References Cited

U.S. PATENT DOCUMENTS

| | | | |
|---|---|---|---|
| 2,864,018 | 12/1958 | Aeschmann | 310/181 X |
| 3,370,189 | 2/1968 | Haydon et al. | 310/49 |
| 3,456,138 | 7/1969 | Huber | 310/49 |
| 3,495,107 | 2/1970 | Haydon | 310/49 |
| 3,596,119 | 7/1971 | Goldmann | 310/49 |

*Primary Examiner*—Donovan F. Duggan
*Attorney, Agent, or Firm*—Blum, Moscovitz, Friedman & Kaplan

[57] ABSTRACT

A step motor having a rotor adapted to rotate a full revolution in response to each pulse applied to the stator is provided. Positioning magnets are provided for positioning a rotor in a rest position and a stator is positioned around the rotor to overcome the magnetic field of the positioning magnets upon the application of a pulse to the stator to thereby effect a complete revolution of the rotor.

9 Claims, 7 Drawing Figures

STEP MOTOR

BACKGROUND OF THE INVENTION

This invention relates to a step motor and in particular to a small-sized step motor for use in electronic wrist watches and the like. Although the use of step motors in quartz crystal wrist watches has become well known, the performance of such step motors in small-sized timepieces has been less than completely satisfactory.

The problems most often encountered in prior art stepping motors are the inability of such motors to limit their power consumption to several microwatts, the inability to generate a high output torque for operating accessory mechanisms such as calendars or the like, the absence of simplified designs; the inability to reduce the cost of the components utilized and hence the manufacturing costs, and the difficulty in obtaining the high precision required in the assembly thereof to enable their use in an electronic wrist watch.

SUMMARY OF THE INVENTION

Generally speaking, in accordance with the invention, a step motor having a magnetized permanent magnet rotor adapted to rotate a full revolution in response to each pulse applied to the stator is provided. The step motor includes magnetic positioning devices adapted to produce a flux field for magnetically positioning said rotor in a rest position and a stator positioned to drive the rotor. The stator, in response to a pulse applied thereto, is adapted to produce a flux field opposite to and of sufficient strength to overcome the flux field generated by the magnet positioning devices, the reversal of the flux field in response to the applied pulse affecting a complete rotation of the rotor.

Accordingly, it is an object of this invention to provide an improved step motor having high reliability yet being manufactured at a reduced cost.

It is a further object of this invention to provide a step motor capable of developing a high output torque with low power consumption.

It is still a further object of this invention to provide a simplified step motor adapted to be constructed by mass production techniques.

Still other objects and advantages of the invention will in part be obvious and will in part be apparent from the specification.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
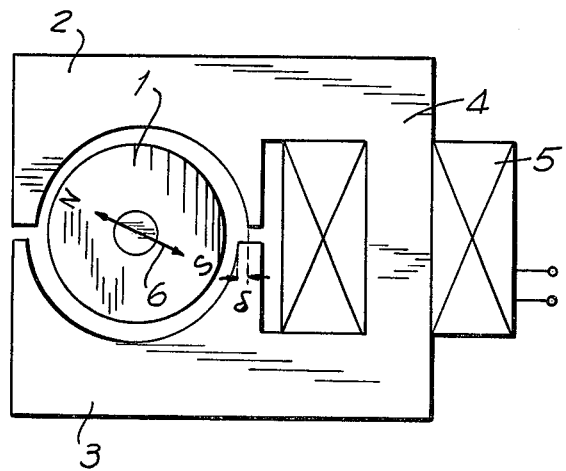
FIG. 1 is a plan view of a conventional step motor constructed in accordance with the prior art.
Figure 2:
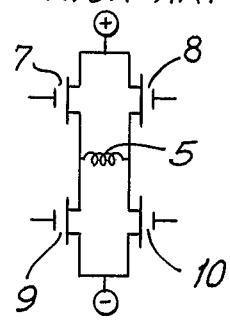
FIG. 2 is a circuit diagram of a conventional driving circuit utilized in accordance with the prior art.

Reference is made to FIGS. 1 and 2, wherein a step motor and driving circuit constructed in accordance with the prior art are respectively depicted. The motor includes a permanent magnet rotor 1 which is diametrically magnetized to provide a pair of opposite polarity poles. The stator 4 includes a pair of stator poles 2 and 3 which surround rotor 1. A coil 5 is wrapped around the stator at the point where stator poles 2 and 3 are joined in order to effect a flux field around the rotor upon the application of a signal to the winding 5.

As is particularly illustrated in FIG. 1, the portions of the stator poles 2 and 3 surrounding rotor 1 have a semi-circular cross-section and are staggered with respect to each other, the staggering effecting a rotation of the rotor 1 in a definite direction in response to the current pulses applied to the winding 5. The amount of staggering $\delta$ is selected so that the opposite poles of the rotor 1 come to a stop in a direction indicated by the arrow 6. When a current pulse is applied to coil 5 to thereby reverse the polarity of the stator poles, the attraction and repulsion principle is utilized to cause the rotor to be rotated. Specifically, if stator pole 2 has a south polarity and stator pole 3 has a north polarity in the absence of a signal applied to coil 5, upon application of the excitation signal thereto, the polarity of the two stator poles is reversed rendering the poles of the rotor facing the stator poles the same polarity as the stator poles. Accordingly in response to the like polarities of the stator poles and the rotor poles, the rotor rotates 180° and comes to a stop. Thereafter a current pulse of opposite polarity is applied to coil 5, and the rotor is again rotated through 180° to complete the revolution of the rotor whereupon it comes to a rest position. Accordingly, by the repeated application of alternating polarity pulses, the rotor is continuously rotated.

Although the above noted description of a prior art step motor illustrates a rotor magnetized into two opposite polarity poles, the use of rotors having six poles is well known. Of course, the application of a pulse to such a rotor would only effect a rotation of the rotor through 60° for each pulse applied to the stator. Similarly, a 10-pole or more rotor operates in a similar manner. Although such step motors overcome certain of the disadvantages noted above, such prior art step motors suffer from the following disadvantages.

First, it is necessary to provide a precise stagger between the stator poles surrounding the rotor. Specifically, when the amount of the staggering $\delta$ of the stators is not exact, one of three problems is likely to occur. A first problem encountered is that the motor will not operate. Even if the motor operates it is possible that no output torque will be generated by the motor. Finally, the motor will sometimes operate through two or more steps in response to a single pulse. Thus, only exact tolerances are permitted for the stagger $\alpha$. Accordingly in a multiple-pole step motor wherein the angular increment per each step is small, the likelihood that an inexact stagger will cause an improper operation of the step motor is increased.

As a practical matter exact tolerances required in manufacturing such step motors are not easily achieved. Therefore it is a practice to include a vernier adjustment unit mounted to the stator to permit the stator positions to be adjusted. The inclusion of such a vernier unit considerably increases the cost of manufacturing each step motor.

Still another problem encountered in the manufacture of prior art step motors is that in order to obtain a highly efficient performance, the gap between the rotor and the stator must be very narrow and the permanent magnet rotor must be formed of a magnet having an extremely high coercive force. The more narrow the gap the more likely that dust or fluff will collect therein necessitating the use of high coercive force materials and thereby further increasing the cost of manufacturing such motors.

Still another disadvantge of the prior art step motors is particularly illustrated by the driving circuit depicted in FIG. 2. Because the drive current utilized for driving a step motor must comprise alternately reversed current pulses, it is necessary to provide a circuit having four transistors 7, 8, 9 and 10. MOS transistors are required because the peak value of the drive current pulses must be of a large magnitude. Accordingly, the necessity of utilizing high performance transistors further increases the cost of manufacturing such step motors.

Finally, the variations in the direction of magnetization of the rotor results in a differential angular increment of rotation for each step of the motor. Thus, when a step motor is used in an electronic timepiece, the positioning of the second hand varies from second to second which although not effecting the accuracy of the timepiece, appears to be very unsightly to the user of such timepiece.

Figure 3:
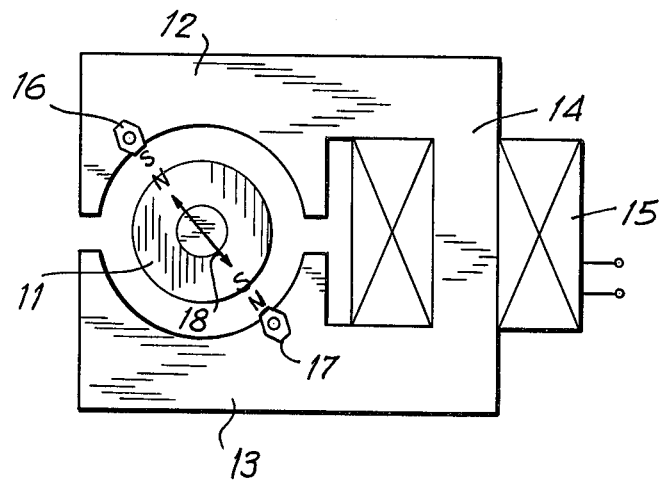
FIG. 3 is a plan view of a step motor constructed in accordance with the instant invention.

Reference is now made to FIG. 3, wherein a step motor constructed in accordance with the instant invention is depicted. The step motor includes a permanent magnet rotor diametrically magnetized to provide a pair of opposite polarity poles. The stator 14 includes a pair of stator poles 12 and 13 which surround the rotor. Also, a coil 15 is wound around the portion of the stator which joins the two stator poles to effect a magnetic flux around the rotor 11 upon the application of a current pulse to the coil 15. A pair of positioning magnets 16 and 17 are respectively mounted on stator poles 12 and 13, the polarity thereof being opposite to the polarity of the rotor poles in facing relationship therewith, the pair of positioning magnets 16 and 17 being symmetrically disposed with respect to the center of the rotor 11.

The positioning of the magnets 16 and 17 are selected to attract the opposite poles of the rotor 11 and cause the rotor to remain at a rest position. In the embodiment depicted in FIG. 3, magnets 16 and 17 are S and N, respectively, to attract the oppositely magnetized rotor poles and position the rotor at a rest position, as indicated by the arrow 18. In operation, a short current pulse is applied to the winding 15 to excite the stator pole 12 to take on an N-polarity and the stator pole 13 to take on an S-polarity to thereby cause the rotor 11 to be rotated through an entire revolution by each pulse applied. In a preferred embodiment, the rotor 11 is formed of a rare earth cobalt such as $SmCo_5$ with an outer diameter of 2 mm and a thickness of 0.5 mm. The stator poles 12 and 13 have an inner diameter of 3 mm. The coil 15 is formed of 25 microns diameter copper wire having 9000 turns and a D.C. resistance of 1.7 to 1.8 kilo-ohms. The magnets are formed of Vicalloy magnets. When a drive pulse of 1.5 volts with a pulse width of 4 to 12 milliseconds and peak current of 800 microamperes is applied, the rotor 11 is rotated through 360° per pulse and the output torque is sufficient for its use in an electronic wrist watch.

It is noted that a large tolerance is permitted for the variations in the attractive forces acting between the rotor 11 and the magnets 16 and 17 as well as the selection of the position of the magnets, thereby rendering such a construction particularly suitable for mass production. Furthermore, a step motor is provided which requires no adjustment to insure stable operation, a feature particularly disadvantageous in prior art step motors.

Moreover, since the angular increment per step is as high as 360°, the possibility of more than one step occurring in response to one pulse is thereby eliminated. Additionally, because the rotor comes to a stop or rest position at an identical location each time, variations in the magnetization direction of the magnets can be ignored thereby assuring a highly precise operation of the step motor at a rate of 360° per step. Finally, it is noted that the rotor need not be formed with a high performance magnet since the gap between the stator and the rotor may be increased enough to eliminate the precise manufacturing tolerances required in the prior art motors which yielded the ingress of dust and fluff in the gap.

Also, because the current pulses utilized to drive the motor can be unidirectional or single phase, the drive circuit may be simplified. For instance, a single drive MOS transistor could be utilized to provide the necessary driving current. Additionally, when compared with the width of the drive pulse used in a conventional step motor, the pulse width used in the step motor according to this invention is significantly reduced thereby reducing power consumption of the motor without any loss in operating efficiency.

Figure 4:
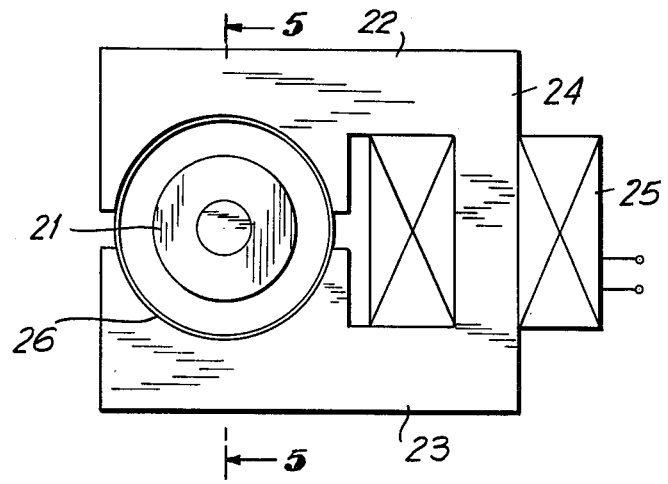
FIG. 4 is a plan view of a step motor constructed in accordance with an alternate embodiment of the instant invention.
Figure 5:
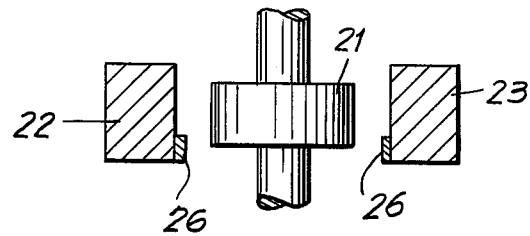
FIG. 5 is a sectional view taken along line 5—5 of FIG. 4.

Referring now to FIGS. 4 and 5, a step motor constructed in accordance with an alternate embodiment of the instant invention is depicted. A stator 24 includes stator poles 22 and 23 surrounding a rotor 21, the stator poles having a coil 25 wrapped around the portion of stator joining the poles. A thin annular magnet 26 is disposed along the inner periphery of the stator poles 22 and 23 in the gap between the stator poles and the rotor. The magnet 26 is diametrically magnetized to provide a pair of opposite polarity poles. Consequently, the rotor 21 remains in a rest position with the poles thereof oriented in alignment with the poles of the magnet 26 in the same manner as indicated in FIG. 3, and rotation of the rotor is effected by the application of the pulse to the coil 25 in the same manner as decribed in the embodiment depicted in FIG. 3.

Figure 6:
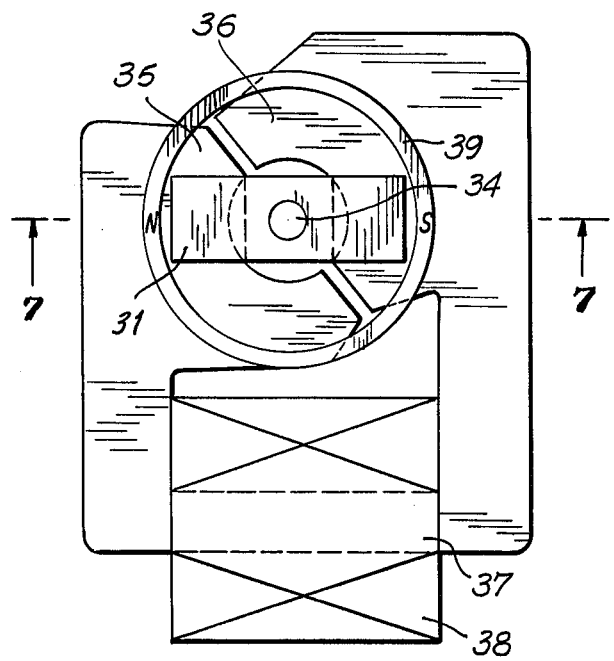
FIG. 6 is a plan view of a step motor constructed in accordance with still another embodiment of the instant invention.
Figure 7:
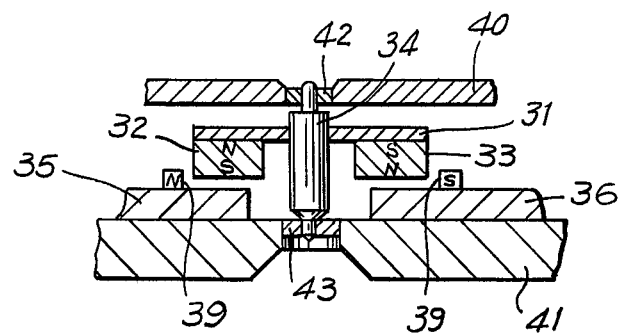
FIG. 7 is a sectional view taken along lines 7—7 of FIG. 6.

Referring now to FIGS. 6 and 7, still another embodiment of the instant invention wherein a rotor 34 including a high permeability portion 31 and a pair of axially magnetized permanent magnets 32 and 33 are illustrated as being rotatably secured in plates 40 and 41 by bearings 42 and 43, respectively. Stator poles 35 and 36 are disposed on plate 41 so that the application of a current pulse to coil 38 will effect a magnetizing of the stator poles. A rotor positioning ring 39 is concentrically disposed about the rotor and is positioned on the stators, the ring being diametrically magnetized to form a pair of opposite polarity poles which cause the rotor to remain at a rest position as indicated by the line 7—7 due to the force of attraction between the rotor poles and thr rotor positioning ring 39. Similarly, like the embodiments noted above, if a current pulse is applied to the coil 38, the respective stator poles will assume a polarity opposite the polarity of the rotor positioning rings and thereby cause the rotor to be rotated in a clockwise direction. At that moment, each of the lower poles of the permanent magnets 32 and 33 which together with the rotor 34 approach the polarity of the poles of the rotor positioning ring thereby gradually slowing down the rotational speed of the rotor 34. However, by choosing a suitable width for the voltage pulses applied to the coil, the rotor 34 continues to rotate past the poles of similar polarity on the rotor positioning ring 39 until the entire revolution is completed whereupon the rotor is stabilized at its rest position.

As was noted above, in the prior art motor, the degree of staggering between the stators in a common plane greatly influences the performance of the motor and therefore renders significant the fine adjustment required in manufacturing such a step motor. However, staggering in the plane of the motor presented a problem in the prior art by requiring a difference in the axial height of the stator poles 35 and 36 in the type embodiment illustrated in FIGS. 6 and 7. This problem can be limited within a practical tolerable range without any difficulties during the manufacturing process of the instant invention. Accordingly, a motor constructed in accordance with the instant invention is influenced minimally by the staggering of the stators in the plane, thus allowing satisfactory operation without the usual practice which requires fine adjustments. Moreover, because the tolerances allowed for the positioning ring 39 are considerable, no adjustment thereof is needed thereby yielding a step motor which overcomes the mass production disadvantages of the conventional step motors of the prior art.

It is noted that although a step motor constructed in accordance with the instant invention has a rotor which rotates 360° per step, thereby yielding a step motor having a high stability and a high precision, a step motor having a rotor which rotates with 360° per pulse is not limited to the embodiment as described and it is obvious that various modifications and improvements are contemplated thereby.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In a step motor having a rotor magnetized to have a pair of magnetically opposed circumferentially spaced poles said rotor being adapted to rotate a complete revolution in response to each pulse applied to said motor, the improvement comprising magnetic positioning means adapted to produce a first flux field for magnetically positioning said rotor in a rest position, and two stator poles surrounding said rotor and defining a substantially uniform gap between said stator poles and said rotor, said stator pole portions in facing relationship defining a gap therebetween, said stator poles in response to a pulse applied thereto being adapted to produce a second flux field sufficient to overcome the flux field positioning said rotor in a rest position, said second flux field effecting a complete rotation of said rotor.

2. A step motor as claimed in claim 1, wherein said magnetic positioning means includes two permanent magnets disposed on stator poles.

3. A step motor as claimed in claim 2, wherein the polarity of each of said magnets is opposite to the polarity of the rotor pole in facing relationship therewith, to thereby effect said positioning of said rotor at a rest position.

4. A step motor as claimed in claim 1, wherein said positioning means is a permanent magnet ring magnetized to define circumferentially spaced poles in a gap between said stator means and said rotor.

5. A step motor as claimed in claim 4, wherein the polarity of the poles of said magnetic ring is opposite to the said rotor pole in facing relationship therewith to thereby define said rest position.

6. A step motor as claimed in claim 3, wherein said stator poles includes a magnetic portion between said two stator poles and a coil wrapped about said magnetic portion, said coil being adapted to have pulses applied thereto.

7. A step motor comprising magnetically permeable rotor means adapted to rotate about the axis thereof, said rotor means having a pair of oppositely oriented magnets and stator means having first and second portions defining stator poles, said stator poles being in equispaced registration in the axial direction of said rotor with said pair of oppositely oriented magnets to define a flux field therewith upon the application of a pulse to said stator means, and a permanent magnet positioning means positioned for cooperation with said rotor magnets to define a magnetic flux field with said rotor for positioning same at a rest position.

8. A step motor as claimed in claim 7, wherein said permanent magnet positioning means is mounted on said stator means and defines a pair of magnetic poles each in registration with and of opposite polarity to the adjacent pole of one of said rotor permanent magnets.

9. A step motor as claimed in claim 8, wherein said permanent magnet positioning means is a ring.

* * * * *